Jan. 16, 1934. L. G. COPEMAN Re. 19,055

REFRIGERATING SYSTEM

Original Filed March 27, 1931 2 Sheets-Sheet 1

INVENTOR.
LLOYD G. COPEMAN.

BY

Barnes & Kisselle
ATTORNEYS

Jan. 16, 1934. L. G. COPEMAN Re. 19,055

REFRIGERATING SYSTEM

Original Filed March 27, 1931 2 Sheets-Sheet 2

INVENTOR
LLOYD G. COPEMAN.
BY
Barnes & Kisselle
ATTORNEYS

Reissued Jan. 16, 1934

Re. 19,055

UNITED STATES PATENT OFFICE 19,055

REFRIGERATING SYSTEM

Lloyd G. Copeman, Flint, Mich., assignor to Copeman Laboratories Company, Flint, Mich., a corporation of Michigan Original No. 1,840,619, dated January 12, 1932, Serial No. 525,786, March 27, 1931. Application for reissue August 2, 1933. Serial No. 683,396

22 Claims. (Cl. 62—91.5)

This invention relates to a refrigerating system, and particularly to a novel method and apparatus for utilizing solidified $CO_2$ or similar substances as a refrigerating medium and source of power. This application is a continuation in part of my Patent No. 1,840,702, issued January 12, 1932.

The present invention is an improvement over that disclosed in my prior patent in that it relates more particularly to the cooling of a relatively large body of brine and the manner in which this brine is circulated to obtain a more efficient refrigeration thereby. More specifically the present invention resides in using a surplus of evaporated $CO_2$ gas over that required to effect circulation of the refrigerating medium. In other words, the gist of the present invention resides in greater and more efficient circulation which directly results in a more efficient transfer of heat units and the obtaining of a regulable but extremely cold body of refrigerating medium surrounding or forming a part of the cooling unit.

Other features reside in the particular form of agitating means for the relatively large body of brine which may be maintained at relatively low temperatures by the system, and the manner in which circulation of the refrigerating medium is obtained together with the novel use of practically all the $CO_2$ gas evaporated from the solid body of $CO_2$.

One of the important features of the present invention resides in the novel combination of the refrigerant producing means or what might be termed broadly the refrigerating unit in combination with the cooling unit, together with the simplicity and design of this refrigerating unit itself.

Figure 1:
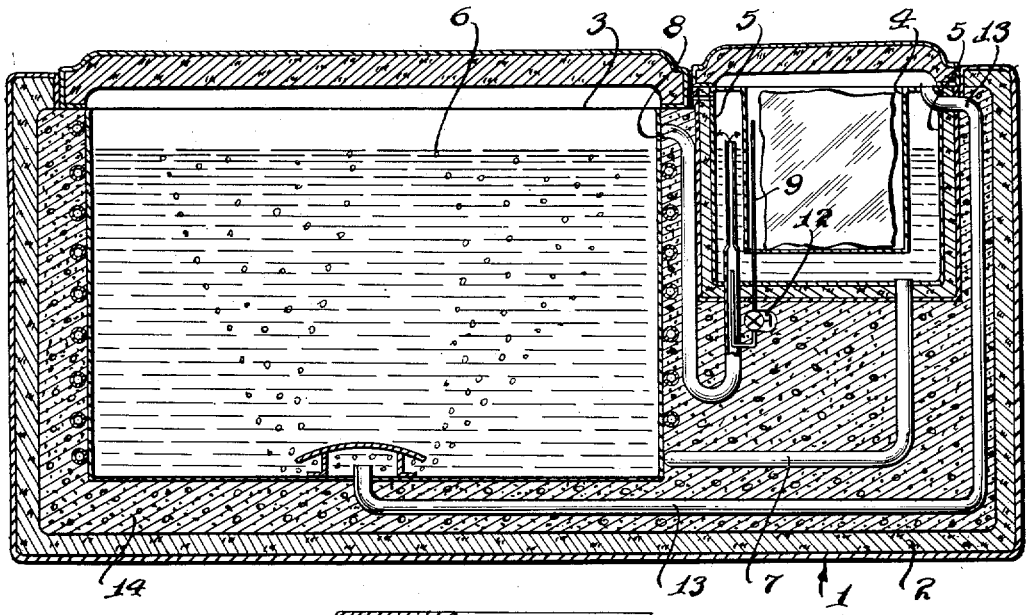
Fig. 1 is a vertical sectional view of one form of refrigerating unit embodying the present invention.

In Fig. 1 I have shown what might be termed broadly a refrigerating system embodying a dipping tank. The refrigerating unit itself is preferably compact and unitary and may be broadly designated 1. This unit may consist of the usual outer casing such as used in an ice cream cabinet with a suitable lining of insulating material 2.

Within this casing may be positioned a dipping tank 3 and a solid $CO_2$ container 4. This container 4 may, if desired, be perforated so that the brine may circulate directly around the solid $CO_2$, but I prefer to have this container 4 imperforate and surrounded with a brine container 5.

A substantially constant body of brine is adapted to be maintained within this container 5 and of course, is in direct heat conducting relation with the $CO_2$ container 4. The body of brine in the container 5 may be conducted to and have a refrigerating effect upon the body of brine 6 in the dipping tank by means of a coil 7 which encircles the tank 3 and is positioned in heat conducting relation thereto. This coil 7 terminates in one or more conduits 8 which preferably extend vertically up through the body of brine in the tank 5.

Figure 2:
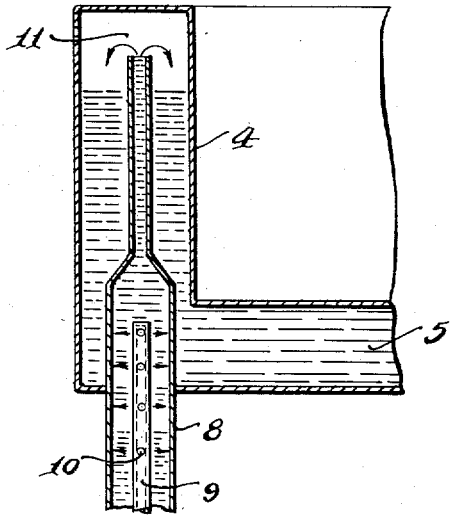
Fig. 2 is an enlarged fragmentary view of a portion of one form of pump which may be utilized for circulating the refrigerant.

A conduit 9 is adapted to conduct the evaporated $CO_2$ gas and direct the same into the coil or coils 8 in a manner which is more clearly illustrated in Fig. 2. This conduit 9 may have a series of laterally extending apertures 10 therein for the discharge of the $CO_2$ gases into the brine within the conduit 8. It will be obvious that these gases may be discharged into the refrigerant within the conduit 8 in various different ways but the effect is to cause positive circulation of the refrigerant by the injection of the $CO_2$ gases. The refrigerant within the conduit 8 will be made to positively rise and be discharged out the top of the conduit as at 11 and replenish the supply of brine within the container 5. This positive circulation will, of course, cause the cold brine surrounding the $CO_2$ container 4 to pass into the conduit 7 and continue its circulation around the coils. A suitable valve 12 is positioned in the conduit 9 so as to control the flow of evaporated $CO_2$ into the conduit 8 and thus control the circulation of refrigerant through said conduit 8 and through the entire system. This valve 12 may be connected to any suitable thermostat (not shown) as will be understood by those skilled in the art, whereby the flow of $CO_2$ and circulation of brine may be automatically accelerated or retarded in case a predetermined temperature is desired within the dipping tank.

It will be obvious here that as circulation of the brine or other refrigerating medium through the coils is retarded that the temperature of the brine within the container 5 will also rise thus permitting more rapid evaporation of the solid $CO_2$ with the result that as the thermostat or other unit causes reopening of the valve immediate and efficient cooling of the brine, as it circulates around the container 4, is obtained.

The surplus evaporated gas over that required to cause circulation of the brine within the circulating conduits may be conducted through a suitable conduit 13 and into the brine 6 within the dipping tank. The passage of this surplus $CO_2$ through the brine will not only assist in cooling and agitating the same, but the escaping $CO_2$ from the dipping tank will be beneficial in the preserving of meats and the like which might be stored in positions adjacent the cooling unit.

The circulating coils 7 are preferably embedded in the mass of plastically applied stone or other material 14 having relatively good hold-over and conductive properties. This stone also preferably surrounds the container 5 although I prefer to provide a lining of insulating material immediately around the container 5 whereby the relatively low temperature within the container 5 may be maintained independently of the temperature within the dipping tank. It will be obvious that this stone or similar material will provide a very effective hold-over for the dipping tank and thus materially reduce the evaporation of the solid $CO_2$ to maintain the required temperatures and also hold the dipping tank to a relatively low temperature in case the supply of solid $CO_2$ should be temporarily exhausted.

Figure 3:
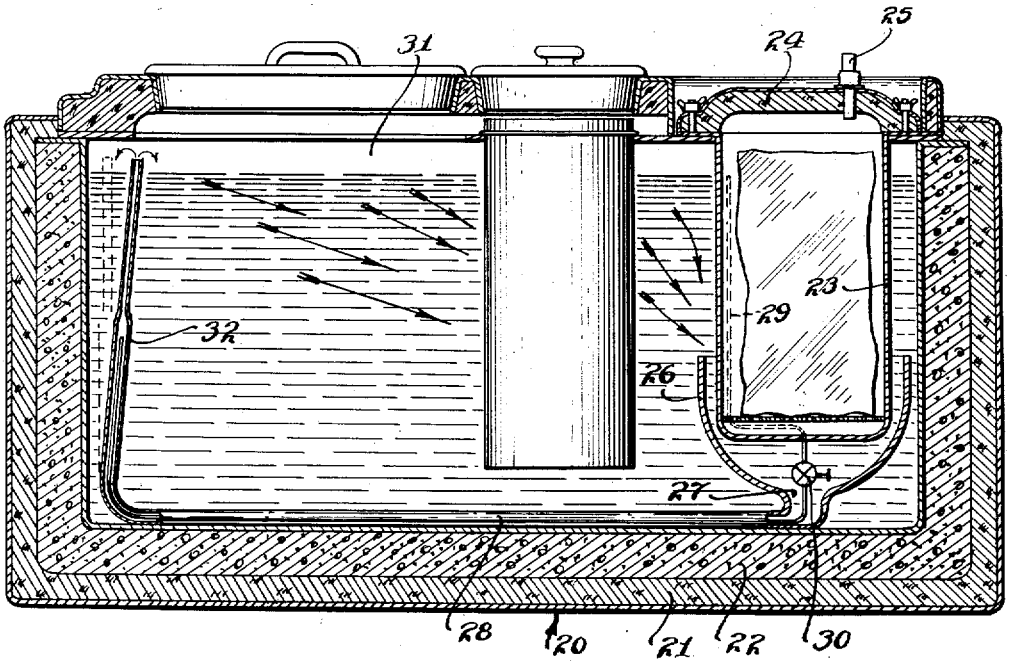
Fig. 3 is a vertical sectional view of a modified form of refrigerating unit embodying the present invention.
Figure 4:
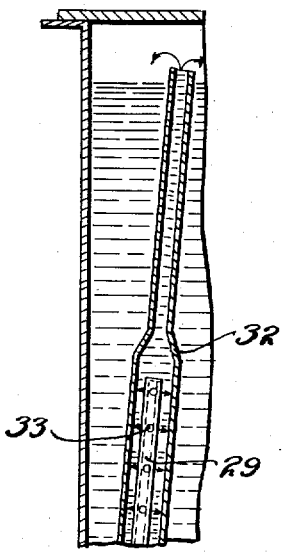
Fig. 4 is an enlarged fragmentary view of a portion of one of the pump units utilized for circulating the refrigerant in a unit such as shown in Fig. 3.

In the modification illustrated in Fig. 3, I preferably utilize a tank similar to that shown in Fig. 1 and broadly designated 20. This tank may be suitably insulated as at 21 and also provided with a lining 22 of stone or similar material having good hold-over and conductive properties. In the case of this particular modification the container 23 for holding the charge of solidified $CO_2$ is preferably immersed directly in the refrigerating medium forming a part of the dipping tank or similar refrigerating unit.

The top of this container 23 is, of course, sealed by means of the cover 24 and this cover may be provided with a suitable relief valve 25. An enlarged conduit 26 surrounds the lower end of the container 23 and the lower end of this conduit 26 terminates in one or more entrances 27 which form the mouth of the circulating conduit or conduits 28.

A conduit 29 may be provided for conducting the evaporated $CO_2$ from the container 23 through the circulating conduit or conduits 28 and a suitable valve 30 may be provided for this conduit 29 whereby to control the flow of gas through the conduit 29. It will be understood that this valve 30 may be connected to any suitable thermostat or other control means (not shown) whereby the valve may be opened or closed to accelerate or retard the flow of gas through the conduit 29 in accordance with the temperature of the dipping tank or other refrigerating unit.

I preferably utilize a plurality of conduits 28 and these conduits also preferably extend along the bottom of the dipping tank 31 and then substantially vertically as at 32 so that the ends of the conduits 28 discharge at the top and far side of the tank relative to the container 23. It will be understood that the discharging portions 32 of the conduit 28 may be exactly vertical as shown in dotted lines in Fig. 3 or slightly inclined as shown in solid lines in Fig. 3. The important point here, however, is the fact that such discharging portions 32 are substantially vertical whereby the circulating brine or other refrigerating medium is easily circulated and discharged without the necessity of passing through numerous bends and the like.

The end of the conduit 29 preferably terminates within the vertical portion 32 of the conduits 28 and such end of the conduit 29 may be provided with a plurality of apertures 33 for the discharge of the evaporated $CO_2$ gas into the brine to cause positive circulation thereof.

By using a relatively large number of circulating conduits 28 and a relatively large supply of evaporated $CO_2$ gas, it will be obvious that the refrigerant or brine 31 will be drawn downwardly around the container 23 and into the enlarged mouth 26. Direct conductivity between the contents of the container 23 and the surrounding brine is thus obtained and as this device causes positive and rapid circulation of the brine it will be seen that a rapid heat transfer is obtained by the brine wiping the surfaces of the container 23. This cool brine is pushed or drawn through the circulating conduits 28 and discharged at the top of the tank to be again circulated. The temperature of the brine within the dipping tank 31 may thus be reduced to an extremely low point in accordance with the amount of circulation allowed by the valve 30. It will thus be seen that where such a tank is used almost continuously for the dipping and freezing of foodstuffs that a relatively low and predetermined temperature may be maintained at all times.

It will be understood that in the structure shown in Fig. 3 the relief valve 25 may be utilized and set to discharge any surplus $CO_2$ over that required for maximum circulation, and particularly where the valve 30 is to be closed a considerable amount to temporarily retard circulation.

What I claim is:

1. A refrigerating system, comprising a tank holding a relatively large supply of refrigerating medium, a container for receiving a charge of solid $CO_2$ positioned adjacent said tank and forming a part of the refrigerating unit, a body of brine constantly surrounding said $CO_2$ container, a conduit for conducting the evaporated $CO_2$ from said solid $CO_2$ container into said large body of brine to cause agitation thereof, and a mass of material surrounding said large body of brine and said brine around said $CO_2$ container, said material having relatively good hold-over and conductive properties.

2. A refrigerating system, comprising a container for receiving a relatively large body of brine, an enclosed container for receiving a body of solid $CO_2$, a brine container surrounding said $CO_2$ container, a circulating means connected with said last named body of brine and surrounding said large body of brine and in heat conducting relation therewith, said circulating means terminating within said second named body of brine, means for conducting evaporated $CO_2$ into said circulating means to cause positive circulation of the brine therethrough, and a body of stone embedding said circulating means and surrounding said two bodies of brine.

3. A refrigerating system comprising, a container for receiving a relatively large body of brine, an enclosed container for receiving a body of solid $CO_2$, a brine container surrounding said $CO_2$ container, a circulating means connected with said last named body of brine and surrounding said large body of brine and in heat conducting relation therewith, said circulating means terminating within said second named body of brine, means for conducting evaporated $CO_2$ into said circulating means to cause positive circulation of the brine therethrough, and means for conducting surplus $CO_2$ gas into said large body of brine to cause agitation thereof.

4. A refrigerating system comprising, a container for receiving a relatively large body of brine, an enclosed container for receiving a body of solid $CO_2$ a brine container surrounding said $CO_2$ container, a circulating means connected with said last named body of brine and surrounding said large body of brine and in heat conducting relation therewith, said circulating means terminating within said second named body of brine, means for conducting evaporated $CO_2$ into said circulating means to cause positive circulation of the brine therethrough, means for conducting surplus $CO_2$ gas into said large body of brine to cause agitation thereof and means for controlling the flow of said $CO_2$ gas into said circulating means to regulate the flow of brine therethrough.

5. A refrigerating system comprising a tank containing a supply of a refrigerating medium, a container adapted to receive a solid body of $CO_2$ immersed within the refrigerating medium within said tank, circulating means adapted to conduct the refrigerating medium around the bottom of said $CO_2$ container and then upwardly towards the top of the main body of refrigerant, and means for discharging the evaporated $CO_2$ gas from said $CO_2$ container into said circulating means to cause positive circulation of the refrigerating medium therethrough.

6. A refrigerating system comprising a tank containing a supply of a refrigerating medium, a container adapted to receive a solid body of $CO_2$ immersed within the refrigerating medium within said tank, circulating means adapted to conduct the refrigerating medium around the bottom of said $CO_2$ container and then upwardly towards the top of the main body of refrigerant, means for discharging the evaporated $CO_2$ gas from said $CO_2$ container into said circulating means to cause positive circulation of the refrigerating medium therethrough, and means for controlling the discharge of $CO_2$ gas into said circulating means to control the circulation of the refrigerating medium in said tank.

7. A refrigerating system comprising, a refrigerating unit holding a body of refrigerating medium, a container for receiving a charge of solidified $CO_2$ immersed therein, circulating means surrounding the bottom part of said container and terminating in one or more circulating conduits running along the bottom of said main container and terminating in one or more substantially vertical discharge conduits, and means for discharging evaporated $CO_2$ from said $CO_2$ container into said circulating conduit or conduits for causing positive circulating of refrigerating medium downwardly around the $CO_2$ container and then upwardly towards the top of the main container.

8. A refrigerating system comprising a refrigerating unit holding a body of refrigerating medium, a container for receiving a charge of solidified $CO_2$ immersed therein, circulating means surrounding the bottom part of said container and terminating in a plurality of circulating conduits running along the bottom of said main container and terminating in a plurality of substantially vertical discharge conduits, and means for discharging evaporated $CO_2$ from said $CO_2$ container into said circulating conduit or conduits for causing positive circulation of refrigerating medium downwardly around the $CO_2$ container and then upwardly towards the top of the main container.

9. A refrigerating system comprising a main container for receiving a body of refrigerating medium, a container for receiving solid $CO_2$ immersed directly therein, a circulating conduit partially surrounding said $CO_2$ container and terminating in one or more circulating conduits having a substantially vertical discharge portion, and gas conducting means connected with said $CO_2$ container and passing along the inside of the said circulating conduit or conduits and terminating in said vertical discharge portion whereby to discharge gas into said circulating conduits at such vertical portions.

10. A refrigerating system comprising a main container for receiving a body of refrigerating medium, a container for receiving solid $CO_2$ immersed directly therein, a circulating conduit partially surrounding said $CO_2$ container and terminating in one or more circulating conduits having a substantially vertical discharge portion, gas conducting means connected with said $CO_2$ container and passing along the inside of the said circulating conduit or conduits and terminating in said vertical discharge portion whereby to discharge gas into said circulating conduits at such vertical portions, and means for controlling the supply of $CO_2$ through said gas conducting means to control the circulation of refrigerating medium.

11. A refrigerating system comprising a container for holding a relatively large supply of liquid to be refrigerated, a container for receiving a charge of solid $CO_2$ positioned adjacent said supply of liquid and forming a part of the refrigerating system, a body of brine adapted to be positioned in heat conducting relation with the solid $CO_2$ and also in heat conducting relation with the large supply of liquid, means for circulating said brine to effect heat transfer between said solid $CO_2$ and body of liquid, and means for conducting evaporated $CO_2$ gases directly into said liquid.

12. A refrigerating system comprising a container for holding a relatively large supply of liquid to be refrigerated, a container for receiving a charge of solid $CO_2$ positioned adjacent said supply of liquid and forming a part of the refrigerating system, a body of brine adapted to be positioned in heat conducting relation with the solid $CO_2$ and also in heat conducting relation with the large supply of liquid, means for circulating said brine to effect heat transfer between said solid $CO_2$ and body of liquid, and means for conducting a portion of the evaporated $CO_2$ gases directly into said liquid.

13. A refrigerating system comprising a container for holding a relatively large supply of liquid to be refrigerated, a container for receiving a charge of solid $CO_2$ positioned adjacent said supply of liquid and forming a part of the refrigerating system, a body of liquid adapted to be positioned in heat conducting relation with the solid $CO_2$ and also in heat conducting relation with the large supply of liquid, means for circulating said body of liquid to effect heat transfer between said solid $CO_2$ and body of liquid, and means for conducting evaporated $CO_2$ gases directly into the lower portion of the body of liquid.

14. A refrigerating system comprising a container for holding a relatively large supply of liquid to be refrigerated, a container for receiving a charge of solid $CO_2$ positioned adjacent said supply of liquid and forming a part of the refrigerating system, a body of liquid adapted to be positioned in heat conducting relation with the solid $CO_2$ and also in heat conducting relation with the large supply of liquid, means for circulating said body of liquid to effect heat transfer between said solid $CO_2$ and body of liquid, means for conducting evaporated $CO_2$ gases directly into the lower portion of the body of liquid, and means for controlling said positive circulation of brine.

15. A refrigerating system comprising a container for holding a relatively large supply of liquid to be refrigerated, a container for receiving a charge of solid $CO_2$ positioned adjacent said supply of liquid and forming a part of the refrigerating system, a body of brine adapted to be positioned in heat conducting relation with the solid $CO_2$ and also in heat conducting relation with the large supply of liquid, means for circulating said brine to effect heat transfer between said solid $CO_2$ and body of liquid, and means for conducting evaporated $CO_2$ gases directly into said liquid to agitate and assist in cooling the same.

16. A refrigerating system, comprising a container for receiving a body of liquid to be cooled, a second container for receiving a body of solid $CO_2$, the lower portion of said second container and body of solid $CO_2$ being directly positioned in said body of liquid when in operation, means for conducting evaporated $CO_2$ gases from the bottom portion of said container into the body of liquid being cooled whereby the gases will flow downwardly in wiping the inside of the $CO_2$ container and a portion of the body of liquid will wipe the outside of the container and move in the same downward direction, and relief means set to discharge to the atmosphere any surplus $CO_2$ accumulating above a predetermined pressure.

17. A refrigerating system, comprising a container for receiving a body of liquid to be cooled, a second container for receiving a body of solid $CO_2$, the lower portion of said second container and body of solid $CO_2$ being directly positioned in said body of liquid when in operation, means for conducting evaporated $CO_2$ gases from the bottom portion of said container into the body of liquid being cooled whereby the gases will flow downwardly in wiping the inside of the $CO_2$ container and a portion of the body of liquid will wipe the outside of the container and move in the same downward direction, a liquid flow tube extending from the bottom portion of said first container up through the body of liquid, and relief means set to discharge any surplus $CO_2$ over that required to produce maximum flow of liquid through said tube.

18. A refrigerating system, comprising a main container for receiving a body of liquid to be cooled, a second container for receiving a body of solid $CO_2$, said second container having a portion thereof directly positioned within said liquid, a conduit leading from a point adjacent the bottom of said portion positioned within the liquid for conducting evaporated $CO_2$ gases directly into said liquid whereby the $CO_2$ gases flowing downwardly will wipe one side of the container and a portion of the liquid will wipe the other side of said container, and also flowing downwardly due to the thermal differential set up, said $CO_2$ gases discharged into the liquid also assisting in cooling the same, and relief means set to discharge to the atmosphere any surplus $CO_2$ accumulating above a predetermined pressure.

19. A refrigerating system, comprising a main container for receiving and completely enclosing a body of liquid to be cooled, a second container depending from the top portion of said first container for receiving a body of solid $CO_2$, the lower portion of said second container being directly positioned in said body of liquid when in operation, means for conducting evaporated $CO_2$ gases from the bottom portion of said container directly into said body of liquid, and a relief valve extending through the top portion of said main container for discharging any accumulated surplus $CO_2$ over a predetermined pressure.

20. A refrigerating system, comprising a main container for receiving and completely enclosing a body of liquid to be cooled, a second container supported and positioned by one of the walls of the outer container for receiving a body of solid $CO_2$, the lower portion of said second container being directly positioned in said body of liquid when in operation, means for conducting evaporated $CO_2$ gases from the bottom portion of said container directly into said body of liquid, and a relief valve extending through an outer enclosing wall for discharging to the atmosphere any accumulated surplus $CO_2$ over a predetermined pressure.

21. A refrigerating system, comprising a container for receiving a body of liquid to be cooled, a second container for receiving a body of solid $CO_2$, the lower portion of said second container being directly positioned in said body of liquid when in operation, means for conducting evaporated $CO_2$ gases from the bottom portion of said container into the body of liquid being cooled whereby the gases will flow downwardly in wiping the inside of the $CO_2$ container and a portion of the body of liquid will wipe the outside of the container and move in the same downward direction, and relief means set to discharge to the atmosphere any surplus $CO_2$ accumulating above a predetermined pressure, said body of solid $CO_2$ being spaced from the bottom of said $CO_2$ container.

22. A refrigerating system, comprising a container for receiving a body of liquid to be cooled, a second container for receiving a body of solid $CO_2$, the lower portion of said second container being directly positioned in and to one side of the general vertical axis of said body of liquid when in operation, means for conducting evaporated $CO_2$ gases from the bottom portion of said container into the body of liquid being cooled whereby the gases will flow downwardly in wiping the inside of the $CO_2$ container and a portion of the body of liquid will wipe the outside of the container and move in the same downward direction, and relief means set to discharge to the atmosphere any surplus $CO_2$ accumulating above a predetermined pressure.

LLOYD G. COPEMAN.